Feb. 10, 1970     D. M. LIKNESS     3,494,049
APPARATUS FOR FLUID TREATMENT OF GRANULAR MATERIAL
Filed March 18, 1968

Collar-Bearing Around Tube Section

Fluid Inlet

Material Flow

Annular Zone For Particulates

INVENTOR:
David M. Likness

BY:

ATTORNEYS

United States Patent Office 3,494,049
Patented Feb. 10, 1970

3,494,049
APPARATUS FOR FLUID TREATMENT OF GRANULAR MATERIAL
David M. Likness, Des Plaines, Ill., assignor to Universal Oil Products Company, Des Plaines, Ill., a corporation of Delaware
Filed Mar. 18, 1968, Ser. No. 713,737
Int. Cl. F26b 17/18, 3/06
U.S. Cl. 34—135                    4 Claims

ABSTRACT OF THE DISCLOSURE

Apparatus, particularly adapted for air or gas drying of granular material, which uses a slotted self-cleaning inner tube concentrically spaced inwardly from an outer tube so that an annular space is provided for material flow. Preferably, a spiral rib on the inside of the outer tube or an auger arrangement provides for movement of the granular material through the space around the inner slotted tube. Radial fluid flow is outwardly from the interior of the inner tube and into either concurrently or countercurrently moving particulates. In an alternative construction, the outer tube is also of slotted construction to provide a self-cleaning V slot that enlarges in the direction of gas flow.

---

This invention relates to an improved form of apparatus for effecting the contacting of subdivided material with a gaseous or liquid stream. More specifically, there is provided a contacting apparatus which uses a self-cleaning inner screen with an inverted V-type slot whereby a radial outward flow of fluid from such screen will contact material moving in an annular passageway around such screen.

A preferred form of the device uses a spiral blade means from the inside wall of a rotatable outer tube, or a separate auger means, to effect a positive material flow through the unit. Also, where desired, the improved device will utilize a slotted outer screen or tube so that gas flow is radially outward from both of the concentric tubes and the slot means of the outer tube is provided to increase in cross-section (in a V manner) in the outward direction.

There are, of course, many types and varieties of scrubbing, drying or fluid treating units which are adapted to pass a fluid stream into contact with a moving bed or column of particulates. However, the screens or perforate tubes are not usually of the self-cleaning type with slot means which can be correlated with material and/or fluid flow aspects. By way of differentiation, it may be considered a principal object of the present invention to provide at least an inner tube of slotted design, with an increasing cross-section V slotting for the self-cleaning advantage, as well as positive means for moving the granular material longitudinally over and along the inner fluid distributing tube.

The improved device may be used for hot gas drying or roasting operations, such as for grains and ores, although, as will be evident from further study of the improved unit, it can well be used advantageously for various material washing and treating operations. For example, catalysts or other subdivided particles can be subjected to contact with either liquid or gaseous streams in treating, washing, drying, oxidizing, reducing, etc., types of operations. In any event, it is not intended to limit the utilization of the improved apparatus to any one type of process.

Broadly, the present invention provides an apparatus suitable for effecting the contacting of granular material with a fluid stream, which comprises in combination, an outer tube to confine material flow, an inner concentrically positioned self-cleaning type tubular screen section providing an annular space inside said outer tube, a helical type auger screw means within said annular space and providing for a positive material flow in such space, fluid inlet means to one end of said inner tubular screen section and fluid outlet means from the opposing end thereof, particle inlet means to said annular space at one end thereof and outlet means from the opposing end thereof, whereby a fluid stream may flow radially outwardly into the particulate flowing through said annular space.

In some instances it may be sufficient to permit the air, or other fluid stream, to pass radially outwardly from only the inner perforated tube so that the fluid then passes either concurrently or countercurrently in the annular space to thus be with or against the flow of the granular material. As noted hereinbefore, the preferred form of device utilizes a slotted inner tubular screen section. Generally, the slot is formed through the use of wedge-shaped or triangular form wire or rod material being helically wound over longitudinally extending and spaced apart rods whereby the resulting slot is in the nature of an inverted V and increases in cross-sectional area in the inward direction. In other words, in this instance, particulates may work themselves in from the annular space through the slots toward the interior of the fluid distributing tube and against the fluid flow. In alternative embodiments, where deemed desirable, a slotted form of outer tube is also utilized so that the outward radial flow of the gas or liquid stream may be through both the inner and outer tubes. Again, in a preferred construction, the perforate outer tube will be of the improved slotted design having the triangular or wedge-shaped rod positioned with its flat face on the interior of the tube and an increasing cross-sectional area slot radiating outwardly so that any particulates that do pass the slot will carry on through in a self-cleaning manner.

A particular feature of the present improved design with the concentric tubes, is the utilization of auger screw means in combination there with such that there is a positive movement of particulates in the annular space between the tubes. It is readily possible to utilize a separate auger screw means spaced to rotate between the two tubes; however, in a simplified form of design providing an advantageous operation, there is provided a helical baffle around the inside wall of the outer tube such that as the tube is rotated with respect to the inner tube there will be an auger like action and movement of material in a positive manner through the annular space. Conversely, the inner slotted tube may be provided with the attached baffle or auger like screw whereby its rotation will effect the movement of material in the annular space with respect to a fixed or non-moving outer tubular section.

Reference to the accompanying drawing and the following description thereof will serve to more fully illustrate the design and construction of one embodiment of the present improved invention as well as to assist in pointing out advantageous operating features in connection therewith.

Figure 1:
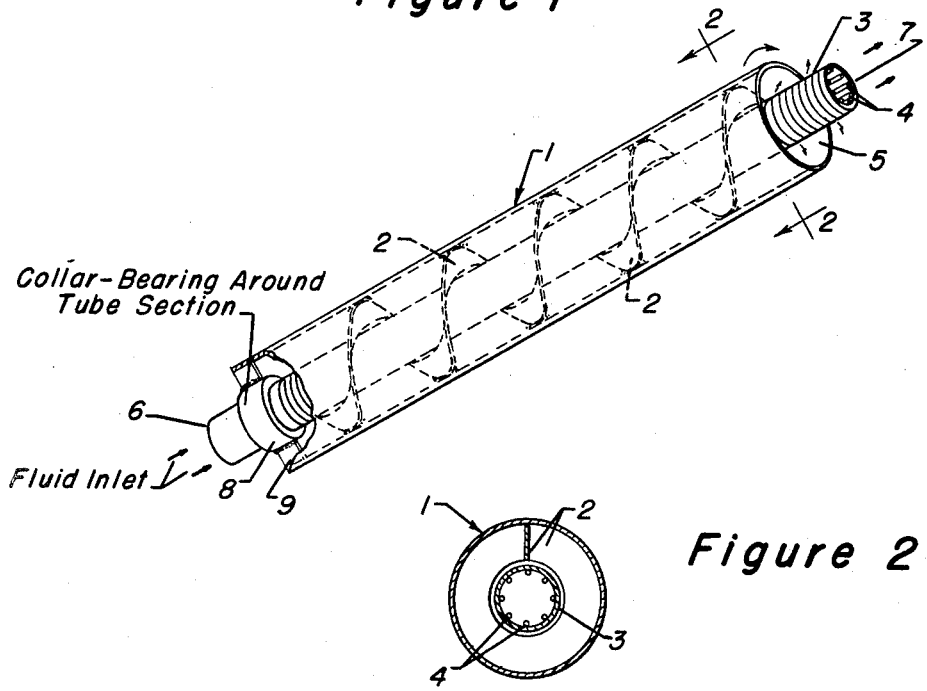
FIGURE 1 of the drawing is an isometric type view of an improved material contacting apparatus, indicating rotation of the outer tubular section with respect to the inner.
Figure 2:
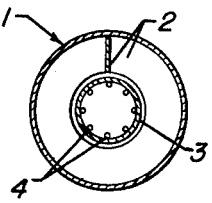
FIGURE 2 of the drawing is a cross-sectional view through the apparatus, as indicated by the line 2—2 in FIGURE 1.

Referring now particularly to FIGURES 1 and 2 of the drawing, there is shown a circular outer tube 1 provided with an inner helical form baffle 2 which is adapted to rotate therewith around a concentrically spaced inner tube section 3. The latter is indicated as being provided with a continuous slot by virtue of its fabrication from a continuous wedge-shaped rod being wound over a plurality of spaced apart longitudinal bars 4. In the present apparatus, the slotted inner tube 3 is adapted to receive an air or other type of fluid stream such that there may be a radial outward flow through such slot means into the annular space 5 between the tubular sections. Although not shown in the present drawing, a suitable arrangement may be provided for mounting the present apparatus such that it is adapted to receive a particulated or granular form of material flow into the annular space 5 and be contacted with the fluid stream flow from inner tubular section 3.

In the present drawing, a fluid inlet is shown at one end 6 and fluid outlet means from the opposing end portion 7. Also, there is shown a collar bearing 8 that is supported from the interior wall of outer tube 1 by spoke means 9. The bearing is adapted to provide a rotatable contact with the outer wall portion of inner tube 3 such that the entire outer tube 1 and helical baffle means 2 will rotate with respect thereto. There, of course, shall be two or more bearings 8 so as to provide the proper spacing and suitable rotation means between the two lengths of concentric tubes 1 and 3. It does not seem necessary to indicate any special means for effecting the rotation of the outer tube 1, particularly since it is not intended to limit the present invention to any one form of motive power. However, by way of example, an electric motor with suitable and conventional drive belt or gearing means may well be provided to connect with the exterior tube 1 to effect the rotation thereof.

To illustrate the operation of the present device, a granular form material which is to be contacted is introduced at the end of the annular space 5 by any conventional means not shown and such material is then passed therethrough, such that there is a continuous contacting of the particles from a radially outward fluid stream flow introduced at the inlet 6. The gas or liquid outlet from zone 5 may be at either end of the device depending on whether it is desired to have a concurrent of countercurrent flow with respect to the material flow. Where the outer tube is slotted, then the fluid flow is primarily all radial. Although the apparatus in FIGURE 1 indicates that it may be in a sloping position, it is to be realized that such device may be in a horizontal position or even in a substantially vertical position without in any way effecting the operation of the device. In other words, in a horizontal position the auger screw means 2 can effect the desired movement of the particulates through the annular zone 5 such that they will be efficiently contacted by the fluid stream entering inner tube 3. On the other hand, when the device is in vertical arrangement, material flow may be downwardly or upwardly through the unit with flow enhanced or maintained by the suitable rotation of the helical baffle means 2 or, alternatively, with the use of suitable separate auger screw means spaced between the two concentric tubes 1 and 3.

As noted hereinbefore, it is not intended to limit the use of the apparatus to any one type of solid type of material or to the use of any one particular gas or liquid stream. In a liquid operation, there may be a subdivided material which is periodically moved or repositioned with respect to a constant fluid stream flow entering into tube 3 and moving radially outwardly through the contact material in annular zone 5.

It may also be noted that it is not intended to limit the improved apparatus to any particular tube sizes, or slot sizes for the tubular members. Generally, the size or width of the slot, provided by the winding of the wedge-shaped rod material, will depend upon the size or nature of the particular solids material carrying through the annular zone 5. In some cases the slot width may be of the order of 0.001", or less, while in other instances, the slot width may be of the order of ⅛" or more. Still further, it is not intended to limit the construction of the apparatus to any one type of material. In other words, the inner and outer tubes and baffle means may be of conventional metals, brass, stainless steel, or any other suitable material. In some instances, it may be of advantage to fabricate the device from suitable plastics, fiberglass, Formica, or like types of materials so as to resist corrosion of a particular chemical reaction.

Various modifications in design may of course be made within the scope of the present invention, as for example, various additional baffling means may be placed within the inner tube 3 or within the annular zone 5 so as to regulate the fluid flow from one end of the apparatus to the other. Cross baffle means within the tube 3 can effect outward radial flow from the inner tube 3 into the annular zone 5. Also, baffling in the latter zone can provide for fluid flow to re-enter the inner tube 3 for subsequent outward radial flow into a still further downstream zone or portion of annular zone 5.

Figure 3:
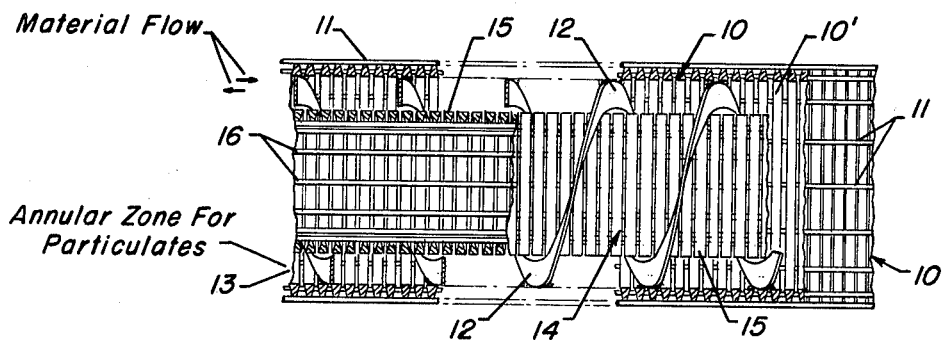
FIGURE 3 indicates, in a partial longitudinal elevational view, the utilization of a slotted outer tubular section as well as a slotted inner tube and the attachment of a helical form baffle or auger means to the inside of the outer tube.

In still another form of modification, such as indicated in FIGURE 3 of the drawing, there may be the utilization of an outer tube or housing 10 which is of a slotted construction having the smooth face on the interior surface thereof whereby any particulates that carry through such outer tubular section will pass on outwardly in a nonclogging manner along with the outward radial flow of the gas or liquid material contacting the solids. Specifically, in FIGURE 3, there is shown the slotted outer tube 10 formed of a helically wound wedge-shaped material 10' joined onto outer spaced longitudinal rod members 11. Attached to the inner face of the tubular section 10 is indicated a helical form baffle 12 which can rotate with such outer tube to provide an auger screw arrangement for the positive movement of solids material carrying through the annular zone 13. The flow of such granular material may be in either direction through the apparatus and around an inner slotted tube 14, with direction of course depending upon the rotation of the outer tube 10. The inner tube 14 is indicated to be a slotted tube with a similar construction to that shown for 3 in FIGURE 1. In other words, the tube may be formed by the winding of triangular or wedge-shaped rod means 15 around spaced longitudinal rods 16.

The construction of FIGURE 3 is of particular advantage for gas drying or treating operations where it is desired to effect the outward radial flow of a large volume of gaseous flow through the annular zone 13. Again, although not shown in the drawing, suitable baffle or flow diverting means may be utilized in combination with the apparatus arrangement utilizing both internal and external slotted tubes, whereby there is a substantially uniform distribution of the entire gas flow from the interior of tube 14 radially outward through the entire length of the contacting section of the apparatus. The gas flow may again be concurrent or countercurrent with respect to material flow in annular zone 13. Where the helical tube 12 is attached to the outer tube 10, then suitable provision may be made to effect the rotation of such tube and in turn enhance the flow of particles in zone 13 by the auger screw effect of baffle means 12. The motive power means for effecting the rotation of tube 12 is not shown in the drawing, but as previously noted, may be provided in any conventional manner.

As still another alternative, both tubes 10 and 14 may be maintained in fixed positions and separate auger screw means, not in contact with the surface of either of the concentric tubes, will be supported on suitable bearing means and have motive power means to effect rotation and the desired longitudinal movement of the subdivided particulate material to carry through annular zone 13 for contact with the fluid stream passing radially outwardly from internal tube 14. Also, where desired, particle collection means may be provided at a downstream end of the internal tube 14 and around the outer tube 10 whereby to collect such particles as may carry through the slots in the respective tubes. However, it is not intended to limit the present invention to the use of any one type of shrouding or particle collecting means for use in combination with the present fluid-solids contacting apparatus.

I claim as my invention:

1. Apparatus suitable for effecting the contacting of granular material with a fluid stream, which comprises in combination, an outer tube to confine material flow, an inner concentrically positioned self-cleaning type tubular screen section, formed of a helically wound rod having a wedge configuration thereby forming an inverted V form slot of increasing cross-section in the inward direction and providing an annular space inside said outer tube, a helical type auger screw means within said annular space and providing for a positive material flow in such space, fluid inlet means to one end of said inner tubular screen section and fluid outlet means from the opposing end thereof, particle inlet means to said annular space at one end thereof and outlet means from the opposing end thereof, whereby a fluid stream may flow radially outwardly into particulates flowing through said annular space.

2. The apparatus of claim 1 further characterized in that a helical-form rib extends longitudinally through said annular space and is attached to the inside of said outer tube whereby the rotation of the latter will provide an auger screw effect to enhance material movement through said annular space.

3. The apparatus of claim 1 further characterized in that a separate auger screw means is positioned within said annular space out of contact with both the inner and outer tubular sections whereby the latter may be stationary and the rotation of the auger screw will provide for enhanced particle movement through said annular space.

4. The apparatus of claim 1 further characterized in that said outer tube is of a self-cleaning slotted tubular screen having a wedge-shaped rod positioned with its flat face on the interior of said tube, thereby forming a slot of increasing cross-section area radiating outwardly.

References Cited

UNITED STATES PATENTS

| | | | |
|---|---|---|---|
| 1,378,407 | 5/1921 | Fraser | 34—137 |
| 1,697,268 | 1/1929 | Evesmith | 34—135 |
| 2,878,584 | 3/1959 | Bianchi | 34—136 |
| 3,142,546 | 7/1964 | Coats | 34—137 |

LLOYD L. KING, Primary Examiner

U.S. Cl. X.R.

34—137